O. M. DE MUNNICK.
AUTOMATIC SIGNALING AND ALARMING SYSTEM FOR RAILWAYS AND THE LIKE.
APPLICATION FILED AUG. 6, 1914.
1,181,949. Patented May 2, 1916.
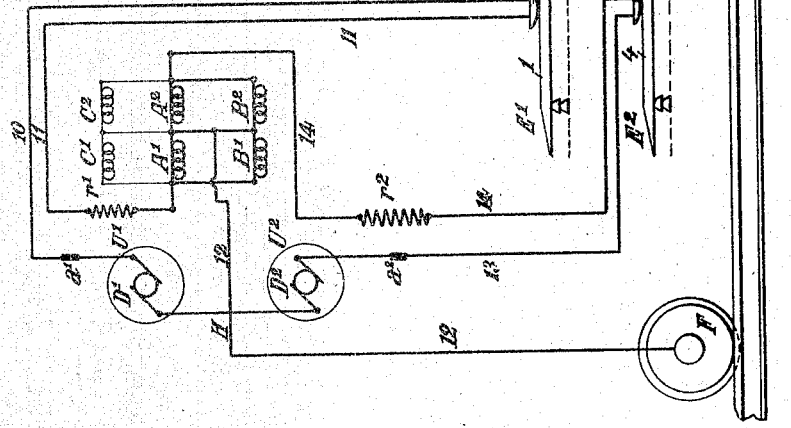
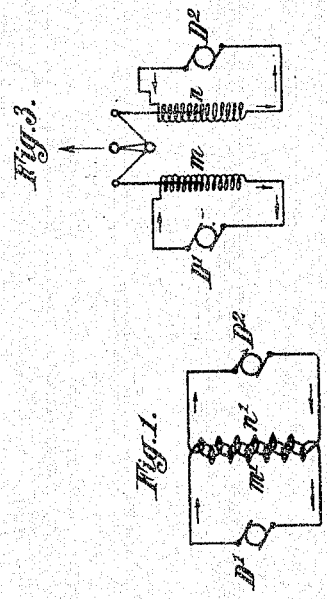
WITNESSES:
INVENTOR
OWEN M. DE MUNNICK
BY
ATTORNEYS

UNITED STATES PATENT OFFICE.

OWEN MAURITS de MUNNICK, OF THE HAGUE, NETHERLANDS.

AUTOMATIC SIGNALING AND ALARMING SYSTEM FOR RAILWAYS AND THE LIKE.

1,181,949.      Specification of Letters Patent.      Patented May 2, 1916.

Application filed August 6, 1914. Serial No. 855,521.

*To all whom it may concern:*

Be it known that I, OWEN MAURITS DE MUNNICK, engineer, a subject of the Queen of the Netherlands, and residing at 142 2de Sweelinckstraat, The Hague, in the Kingdom of the Netherlands, have invented certain new and useful Improvements in Automatic Signaling and Alarming Systems for Railways and the like, of which the following is a full, clear, and exact description.

This invention relates to an automatic signaling and alarm system for use on railways and the like for the operation of signals or alarms on the locomotives or other vehicles, in which in addition to the usual pair of track rails, there is provided a pair of contact rails, and which is characterized by two pairs of independent electric circuits having a source of supply on the locomotive or other vehicle of the train, the said pairs of circuits being, under normal conditions of working, in the state of equilibrium, which is disturbed in the case of any derangement of the said conditions, in such a manner that the consequent difference of potential, produced in the corresponding circuits is utilized either for the operation, by the stronger of the two differential circuits, of a warning signal arranged on the locomotive or other vehicle of the train, or for the direct stopping of the train.

The electric currents required are generated by dynamos mounted on the locomotive or other vehicle. Four circuits are used in the system, two inner and two outer ones. The two inner circuits are arranged independently of each other on the locomotive or other vehicle. An electric current circulates continuously through them as soon as the locomotive or vehicle is moving. If the locomotive or vehicle stops, the current in the said two inner circuits is broken, as the dynamos no longer generate current.

Any derangement of the normal working conditions is at once indicated by the two inner circuits by means of signals, or by the direct stopping of the locomotive, as by application of the brakes, as soon as the state of equilibrium between the two circuits is broken by a fault, by increase of resistance or in some other manner. The said two inner circuits are connected to two outer circuits, by means of a contact rail corresponding to each inner circuit and forming part of the corresponding outer circuit, and the said outer circuits become operative and closed only when a train passes over the contact rails corresponding to the said inner circuits. In this case, each of the inner circuits sends out into the corresponding outer circuit an electric current whereby a new pair of live circuits is formed. The currents sent through this new pair of circuits are, in normal circumstances, also in equilibrium. If, however, the railway signal (for instance, point-setting or block signal) is set at "danger" or if some fault or a greater voltage or some other disturbance appears in one of the two outer circuits, the state of equilibrium will be broken, and either the warning signals are operated, or the train is directly stopped.

This invention thus relates to a system which, by means of dynamos mounted on the locomotive or other vehicle, that is to say, the electric currents supplied by the said dynamos and sent through the track rails and through a pair of rails arranged in proximity to the points to be protected, operate devices for stopping the train or operate in some manner an alarm signal on the engine.

A characteristic feature of this invention is therefore, that the stopping of the train or the operation of the warning signal (alarm bell, whistle, signal lamp or the like) does not depend on a closing of a circuit, but on a disturbance of the state of equilibrium between two electric currents balancing each other and supplied by two independent sources of supply mounted on the train. This results in a break down or variation in the working conditions which becomes at once noticeable at the two dynamos or at any particular point of the two inner or outer circuits, and also avoids the danger of the system failing at a moment when it should be operative.

This invention is therefore based on the principle of current equilibrium. The apparatus can be mounted on any vehicle, whether it be propelled by steam or electricity.

Another characteristic feature of the invention is that the electric energy is not supplied either by batteries carried on the train or from a central power station, but is supplied by two dynamos, independent of each other and mounted on the train.

The accompanying drawings show by way of example a signaling system according to this invention.

Figure 1 shows diagrammatically how the inner circuit of each dynamo may be led through a combined coil, consisting of two separate coils $m^1$ and $n^1$, wound in opposite direction of each other. The current of dynamo $D^1$ is flowing in an opposite direction to the current of dynamo $D^2$ which passes through the second coil. The electromagnetic induction caused by the current of dynamo $D^1$ is completely compensated by the electromagnetic induction of the current of dynamo $D^2$. The consequence is that no magnetic force is present in the coil. At the moment, however, that one of the currents is decreased or increased, the compensation will not be complete as the stronger current will produce a greater induction. This magnetic induction will draw a core into the coil, if it is placed in front of the said coil and the action may be utilized to operate a warning-signal on the train, or apply the brakes automatically.

Fig. 2 is a general diagram of the complete system, showing the way of connecting the dynamo terminals with their respective circuits, the connections of the inner and outer circuits with the contact rail arrangement on the track, their connections to the switch-over device and respective resistances and connections to the track rail.

In Fig. 3 the inner circuits of the two dynamos are again led each to a coil, respectively $m$ and $n$. The cores partly inserted into their respective coils are connected together by an ordinary lever device. The electromagnetic induction caused by the currents of each dynamo in the respective coil will pull the corresponding core into the coil, at each side of the lever with the same strength. As a consequence, the lever will remain at rest. When however the currents differ, the electromagnetic induction in the coils will differ as a consequence. The stronger current will cause the lever to move and this movement may be utilized to bring about the desired warning on the train, or the application of the brakes.

One of the two methods as described above may be adopted in the system to take advantage of the disturbance of the equilibrium of the two currents to operate warning-signals on the locomotive or other vehicle, or to bring the train to a standstill by applying the brakes automatically. Two dynamos $D^1$ and $D^2$, independent of each other and mounted under the tender or at some other point, are driven each independently by one of the axles. One terminal of each of the two dynamos is connected at H to the frame of the tender, while the other terminal is connected to the device to be operated, such as signaling apparatus or the like. On the locomotive there are therefore two circuits which form the inner circuits, while two other circuits, forming the outer circuits, are formed in common partly by the track rail at the beginning of the section to be protected. The first inner circuit is as follows: dynamo $D^1$, from the terminal $U^1$, fuse $a^1$, conductor 10, over the contact shoe $G^1$, conductor 11, through the resistance $r^1$ to the coils or windings of the devices $A^1$, $B^1$ and $C^1$, and through the conductor $12^1$ back to the dynamo $D^1$. The second inner circuit comprises the dynamo $D^2$, from the terminal $U^2$, fuse $a^2$, conductor 13, over the contact shoe $G^2$, conductor 14, through the resistance $r^2$ to the coils or windings of the devices $A^2$, $B^2$ and $C^2$ and through the conductor $12^1$, back to the dynamo $D^2$. Each of these devices $A^1$, $A^2$, $B^1$, $B^2$, $C^1$, $C^2$ can be used for performing any desired work. Thus, for instance, the devices $A^1$, $A^2$ can be used for operating a warning disk, the devices $B^1$, $B^2$, for operating the alarm signal, and the devices $C^1$, $C^2$ for operating an electric alarm or a compressed air brake, for shutting off steam or for other purposes. The two inner circuits are identical and under normal conditions have the same resistance.

When the locomotive or train starts, the two dynamos begin to operate to supply electric current in the two inner circuits. The devices remain inactive, as the two currents balance each other. As soon as there is some disturbance in one of the two circuits, for instance, if a wire breaks, the equilibrium will be destroyed, and the current will no longer pass through one of the two circuits, while the other dynamo continues to send its current undisturbed through its circuit. This latter current will now operate to render the corresponding devices active. The same happens if in one of the circuits of the generators it may be in the inner or outer, there occurs a short-circuiting, which will cause the fuse $a^1$ or $a^2$ according to the dynamo circuit in which the short-circuiting has taken place, to blow immediately, which means that no more current is supplied by that dynamo, neither to its inner-, nor to its outer circuit. The other dynamo however, continues in sending a current through both its circuits. The balance is disturbed and the active dynamo will cause the warning apparatus to operate or applies the brakes automatically. Any disturbance, as well as an increase of resistance in one of the two circuits, will therefore result in the equilibrium being destroyed, and consequently the devices will operate. The two outer circuits are also in equilibrium when the signal stands at "line clear". In such a case, both have the same resistance. These outer circuits are constituted by contact rails $E^1$, $E^2$ by the rail $S^1$ of the track and by conductors required for connecting the contact rails, the switch-over device for the signal and its connection to the track rail $S^1$. The outer circuit of the dynamo $D^1$, the resistance of which in case of the line being clear is different from that when the signal indicates danger, consists:—In the case of a signal "line clear", of the contact rail $E^1$, the conductor O, the switch-over device M, the conductor $P_y$, the resistance $w$, the track rail $S^1$, the wheel F and the conductor 12. In the case of a signal "line blocked", of the contact rail $E^1$, the conductor O, the switch-over device M, the resistance $W^2$, the conductor $P_x$, the track rail $S^1$, the wheel F and the conductor 12.

The resistance of the outer circuit of the dynamo $D^2$ is equal to that of the outer circuit of the dynamo $D^1$ when the signal is set at "line clear" as the resistance $W^1$ is equal to the sum of the resistances of the conductor O, the contacts of the switch M, the conductor $P_y$, and the resistance $w$. The outer circuit of the dynamo $D^2$, consists of the contact rail $E^2$, the resistance $w^1$, the track rail $S^1$, the wheel F and the conductor 12. It remains always the same whether the line is clear or blocked. The contact rails $E^1$ and $E^2$ are subdivied into sections 1, 2, 3 and 4, 5, 6. Each section is separated from the adjacent one by insulation and connected to it by a resistance $Ra$, $Rb$, or $Rc$, $Rd$. In this way the resistance in the outer circuits is regulated during the running of the locomotive or train over the contact rails, and the load on the dynamos on the outer circuits can be regulated at will.

The resistance $w$ in the outer circuit of the dynamo $D^1$ is intended to prevent a complete short-circuiting upon the shoe $G^1$ reaching the section 3 of the contact rail $E^1$, so that practically no other resistance remains in the circuit. The switch-over device M is connected to the signal and adapted to be switched over by means of the chain L, in case of a change of the signal indication from "line clear" to "line blocked." The contact rails are arranged between the track rails and rest on ordinary insulators. These contact rails, as hereinbefore stated, have current passing through them only at the moment when the locomotive or train passes over them, as there is no source of electricity in the outer circuits, and the electric current is supplied by the locomotive or train itself.

When the signal is set at "line clear" and a locomotive or train approaches, as soon as the locomotive or train has reached the contact rails, the contact shoes $G^1$ and $G^2$, switch in the two outer circuits, electric currents are then sent through the two outer circuits. Owing to the connection in the inner circuits of the respective resistances $r^1$ and $r^2$, the resistance of the said circuits can be regulated, for the purpose of obtaining the most advantageously proportional division of the electric current in the outer and inner circuits, the resistance in the inner circuits however always being greater than that in the outer circuits. Accordingly the dynamo $D^1$ then sends an electric current through the conductor 10, the contact shoe $G^1$, the contact rail $E^1$, the conductor O, the switch-over device M, through the conductor $P_y$ and the resistance $w$ to the track rail $S^1$, and further through the wheel F and the conductor 12, back to the dynamo. The dynamo $D^2$ also sends a current through the corresponding outer circuit, that is, through the conductor 13, the contact shoe $G^2$, to the contact rail $E^2$, through $W^1$ to track rail $S^1$ and thence, through the wheel F and the conductor 12, back to the dynamo $D^2$.

As the two dynamos are simultaneously switched into their respective outer circuits, both of which have the same resistance, the increase in load on the two dynamos also takes place always simultaneously. The state of equilibrium remains undisturbed, however, even in the inner circuits, and each time a locomotive or train passes, electric currents are sent through the outer circuits so that the condition of the latter circuits is checked every time. If, however, the signal is set at "line blocked", the outer circuit of the dynamo $D^1$ has a different resistance, that is, it has a much higher resistance, as the switch-over device M is then in the position X, and the resistance $w^2$ is switched in. It will be readily understood that in the latter case, the dynamo $D^1$ having in its outer circuit a much higher resistance $w^2$ will, as a consequence send a much smaller current through its outer circuit than the dynamo $D^2$ which has in its outer circuit its normal resistance $W^1$. Consequently dynamo $D^2$ will be more braked than dynamo $D^1$, upon the switching in of the outer circuits, owing to the greater current that it has to supply to its outer circuit, and in the case of a belt-driven dynamo, this will tend to cause the belt to slip owing to the labored rotation of the armature, and this again will result in the armature no longer making the usual number of revolutions, so that the voltage will be greatly reduced. In any case, the equilibrium in the circuits will be destroyed, because the inner circuit of the dynamo $D^2$ will no longer have the normal voltage and accordingly the electric current of the dynamo $D^1$ which develops in its inner current the greater power, will operate the various devices. A disturbance or derangement in one of the two outer circuits, for instance, a breaking of one of the conductor or resistance wires, will have the same effect, as in that case the equilibrium will also be destroyed.

It is not necessary to explain that with this system one is not bound to use continuous current as, owing to the use of generators, it will be also possible to use small alternating current generators of the most varying constructions with transformers. When transformers are used, as they have no movable parts or contacts, they will not affect the reliability and method of working of the system.

Along the railway line there are no movable parts liable to be rendered inoperative by frost or other influences, and the only movable part, namely the switch-over device connected to the signal, can be arranged in such manner as to protect it from injurious or disturbing atmospheric influences.

By applying the principle of closed circuit to the inner and outer circuits and the both cases, namely when the signal is set at "line clear" and at "danger", the greatest reliability of working is insured, as any defect is at once indicated by the operation of the safety apparatus and warning signals arranged on the engine or other vehicle. This system has the further advantage that it is not necessary to check the outer circuits on the railway separately, as every passing train does the checking.

Having now particularly described and ascertained the nature of my said invention, and in what manner the same is to be performed, I declare that what I claim is:

1. An automatic signaling and controlling system for railways and the like comprising two sources of electricity arranged on the locomotive or other portion of a train, two independent inner circuits adapted to balance each other, one connected to each of said sources of electricity, two independent outer circuits adapted to include contact rails or the like at signal receiving points along the railway, said outer circuits being normally balanced and each connected respectively to an inner circuit and its source of electricity and means operable upon a disturbance of the balance in said circuits for signaling or controlling the train.

2. An automatic signaling and controlling system for railways and the like comprising two sources of electricity, consisting of two suitably driven similar dynamos mounted upon the locomotive or other portion of a train, two independent inner circuits adapted to balance each other, one connected to each of said dynamos, two independent outer circuits adapted to include contact rails or the like at signal receiving points along the railway, said outer circuits being normally balanced and each connected respectively to an inner circuit and its corresponding dynamo and means operable upon a disturbance of the balance in said circuits for signaling or controlling the train.

3. An automatic signaling and controlling system for railways and the like comprising two sources of electricity, consisting of two suitably driven similar dynamos mounted upon the locomotive or other portion of a train, two independent inner circuits adapted to balance each other, one connected to each of said dynamos, two independent outer circuits adapted to include contact rails or the like at signal receiving points along the railway, said outer circuits being of less resistance than the inner circuits and normally balanced, each outer circuit being connected respectively to an inner circuit and means operable by the inner circuits upon a disturbance of the balance of either of said circuits for signaling or controlling the train.

4. An automatic signaling and controlling system for railways and the like comprising two sources of electricity, consisting of two suitably driven similar dynamos mounted upon the locomotive or other portion of a train, two independent inner circuits adapted to balance each other, one connected to each of said dynamos, two independent outer circuits normally of equal resistance, the resistance of which being less than that of the inner circuits, said outer circuits being located at signal receiving points along the railway and adapted to be connected respectively to the inner circuits by contact rails consisting of a plurality of sections insulated from each other and interconnected by suitable resistance forming a continuous circuit and means carried upon the train for signaling or stopping the same upon a change in the resistance of one of said outer circuits.

5. An automatic signaling and controlling system for railways and the like comprising two sources of electricity, consisting of two suitably driven similar dynamos mounted upon the locomotive or other portion of a train, two independent inner circuits adapted to balance each other, one connected to each of said dynamos, two independent outer circuits normally of equal resistance, the resistance of which being less than that of the inner circuits, said outer circuits being located at signal receiving points along the railway and adapted to be connected respectively to the inner circuits by contact rails consisting of a plurality of sections insulated from each other and interconnected by suitable resistance forming a continuous circuit, connections between said contact rails and the track rails whereby the outer circuits are completed back to the respective dynamos.

6. An automatic signaling and controlling system for railways and the like comprising two sources of electricity, consisting of two suitably driven similar dynamos mounted upon the locomotive or other portion of a train, two independent inner circuits adapted to balance each other, one connected to each of said dynamos, two independent outer circuits normally of equal resistance, the resistance of which being less than that of the inner circuits, said outer circuits being located at signal receiving points along the railway and adapted to be connected respectively to the inner circuits by contact rails consisting of a plurality of sections insulated from each other and interconnected by suitable resistance forming a continuous circuit, means controlled by a block signal or the like for changing the resistance of one of the outer circuits thereby causing a disturbance of the balance between said circuits and means carried upon the train for signaling or stopping the train when the balance is thus disturbed.

In testimony whereof I affix my signature in presence of two witnesses.

OWEN MAURITS DE MUNNICK.

Witnesses:
C. A. WOOD,
A. C. NELSON.